United States Patent
Zhao

(10) Patent No.: US 9,081,586 B2
(45) Date of Patent: Jul. 14, 2015

(54) SYSTEMS AND METHODS FOR CUSTOMIZING OPTIMIZATION/TRANSFORMATION/ PROCESSING STRATEGIES

(75) Inventor: Peng Zhao, San Ramon, CA (US)

(73) Assignee: Futurewei Technologies, Inc., Plano, TX (US)

( * ) Notice: Subject to any disclaimer, the term of this patent is extended or adjusted under 35 U.S.C. 154(b) by 81 days.

(21) Appl. No.: 13/570,148

(22) Filed: Aug. 8, 2012

(65) Prior Publication Data

US 2013/0139137 A1 May 30, 2013

Related U.S. Application Data

(60) Provisional application No. 61/564,665, filed on Nov. 29, 2011.

(51) Int. Cl.
*G06F 9/45* (2006.01)
*G06F 9/44* (2006.01)
*G06F 15/16* (2006.01)
*G06F 11/36* (2006.01)
*G06F 9/445* (2006.01)

(52) U.S. Cl.
CPC *G06F 8/443* (2013.01); *G06F 8/41* (2013.01); *G06F 11/3668* (2013.01); *G06F 15/16* (2013.01); *G06F 9/44* (2013.01); *G06F 9/445* (2013.01)

(58) Field of Classification Search
None
See application file for complete search history.

(56) References Cited

U.S. PATENT DOCUMENTS

| | | |
|---|---|---|
| 2001/0020294 A1 | 9/2001 | Ogawa et al. |
| 2003/0014741 A1 | 1/2003 | Megiddo et al. |
| 2003/0074551 A1* | 4/2003 | Chandramouleeswaran et al. ............... 713/100 |
| 2004/0010473 A1* | 1/2004 | Hsu et al. ............... 705/77 |
| 2005/0021870 A1* | 1/2005 | Carnahan et al. ............ 709/249 |
| 2005/0086653 A1 | 4/2005 | Heishi et al. |

(Continued)

FOREIGN PATENT DOCUMENTS

| | | |
|---|---|---|
| CN | 1609805 A | 4/2005 |
| CN | 101551748 A | 10/2009 |

OTHER PUBLICATIONS

Notification of Transmittal of the International Search Report and the Written Opinion of the International Searching Authority, or the Declaration for PCT/CN2012/085531, mailed Mar. 14, 2013, 10 pages.

(Continued)

*Primary Examiner* — Don Wong
*Assistant Examiner* — Mohammad Kabir
(74) *Attorney, Agent, or Firm* — Slater & Matsil, L.L.P.

(57) ABSTRACT

A method for tailored compiler optimization is provided. The method includes extracting kernels from an application program, performance tuning the kernels to determine a tailored optimization strategy for each of the kernels, the tailored optimization strategy different than a default optimization strategy of a compiler for each of the kernels, and annotating the application program, using a computer, to identify the tailored optimization strategy determined for each of the kernels. In an embodiment, the method also includes the design and implementation for adjusting a compiler to customize optimization strategies for different kernels.

19 Claims, 4 Drawing Sheets

(56) References Cited

U.S. PATENT DOCUMENTS

| | | | |
|---|---|---|---|
| 2006/0074821 A1* | 4/2006 | Cristianini | 706/12 |
| 2006/0080643 A1 | 4/2006 | Ogawa et al. | |
| 2006/0123197 A1* | 6/2006 | Dunshea et al. | 711/118 |
| 2007/0033305 A1* | 2/2007 | Malaviya | 710/52 |
| 2009/0077572 A1* | 3/2009 | Andjelic | 719/321 |
| 2009/0129277 A1* | 5/2009 | Supalov et al. | 370/241 |
| 2012/0204154 A1* | 8/2012 | Li et al. | 717/124 |
| 2012/0317556 A1* | 12/2012 | Zhu et al. | 717/146 |

OTHER PUBLICATIONS

OpenMP Application Program Interface, version 3.1 (Jul. 2011) (http://www.openmp.org/mp-documents/OpenMP3.1.pdf); 354 pages.

* cited by examiner

SYSTEMS AND METHODS FOR CUSTOMIZING OPTIMIZATION/TRANSFORMATION/ PROCESSING STRATEGIES

CROSS-REFERENCE TO RELATED APPLICATIONS

This application claims the benefit of U.S. Provisional Application No. 61/564,665, filed on Nov. 29, 2011, entitled "Systems and Methods for Customizing Optimization/Transformation/Processing Strategies," which application is hereby incorporated herein by reference.

TECHNICAL FIELD

The present disclosure relates to systems and methods for customizing optimization/transformation/processing strategies for compilers or other data processing software that apply different strategies to different parts of an input.

BACKGROUND

Performance engineering is a critical step in the development cycle to ensure that efficient binaries are generated from software sources written in high level programming languages. The focus of performance engineering could be runtime performance and code size. There is an ever-increasing gap between software source codes and their binaries.

Software developers improve productivity by adopting software engineering techniques that emphasize modularity, code reuse, and maintainability. Unfortunately, these software engineering practices often contradict with performance engineering, in which engineers push hard to take full advantage of the hardware. It is often the case that there is no straightforward mapping from the software semantics to the low level hardware features. Compiler optimization takes over the burden of transforming the applications written in high-level programming language to binaries. Although a high percentage of compiler usage is just for automatic binary generation, many other cases depend on the compiler to generate efficient code that can take full advantage of the underlying hardware. For example, the importance of compiler optimizations is especially pronounced in digital signal processing (DSP) fields because customized processors are often introduced just to speed-up a set of applications that share the same characteristics. In these scenarios, fully utilizing the underlying hardware is important to increase the hardware's overall competitiveness.

Due to the continuous effort from the academia and the industry, the past five decades have witnessed the creation of a great number of optimization techniques. More and more powerful analysis and optimization techniques are integrated into modern compilers. Although modern compilers are versatile and powerful, they frequently let engineers down by generating sub-optimal or bad binaries. The reasons that contribute to a low quality optimization can be categorized into two categories: hard failure and soft failure. Hard failure means that the compiler misses certain features (analysis or transformation) to handle certain scenarios. This requires extra work to improve the compiler. Soft failure means the scenarios in which a compiler doesn't perform as expected but it can be worked around by using compiler options or small tweakings of the compiler. Experiences have shown that soft failures contribute a significant percentage of performance failures.

SUMMARY

An embodiment method for tailored compiler optimization includes extracting kernels from an application program, performance tuning the kernels to determine a tailored optimization strategy for each of the kernels, the tailored optimization strategy different than a default optimization strategy of a compiler for each of the kernels, and annotating the application program, using a computer, to identify the tailored optimization strategy determined for each of the kernels.

An embodiment method for tailored compiler optimization includes receiving an annotated program from a host, the annotated program identifying a tailored optimization strategy for each of a plurality of kernels, passing the annotated program through a sequence of optimization engines, each of the optimization engines equipped with an adapter configured to implement the tailored optimization strategy corresponding to at least one of the plurality of kernels, and outputting a compiled object program after passing the annotated program through the sequence of optimization engines.

An embodiment processing system configured to implement tailored compiler optimization including a processor and a memory operably coupled to the processor. The memory stores a tailored optimization module and a compiler module. The tailored optimization module is configured to extract kernels from an application program loaded into the memory, to performance tune the kernels by testing a quality of compilation for each of the kernels using the compiler module and a variety of different compilation strategies to determine a tailored optimization strategy for each of the kernels, and to annotate the application program to identify the tailored optimization strategy determined for each of the kernels.

BRIEF DESCRIPTION OF THE DRAWINGS

For a more complete understanding of the present disclosure, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Figure 1:
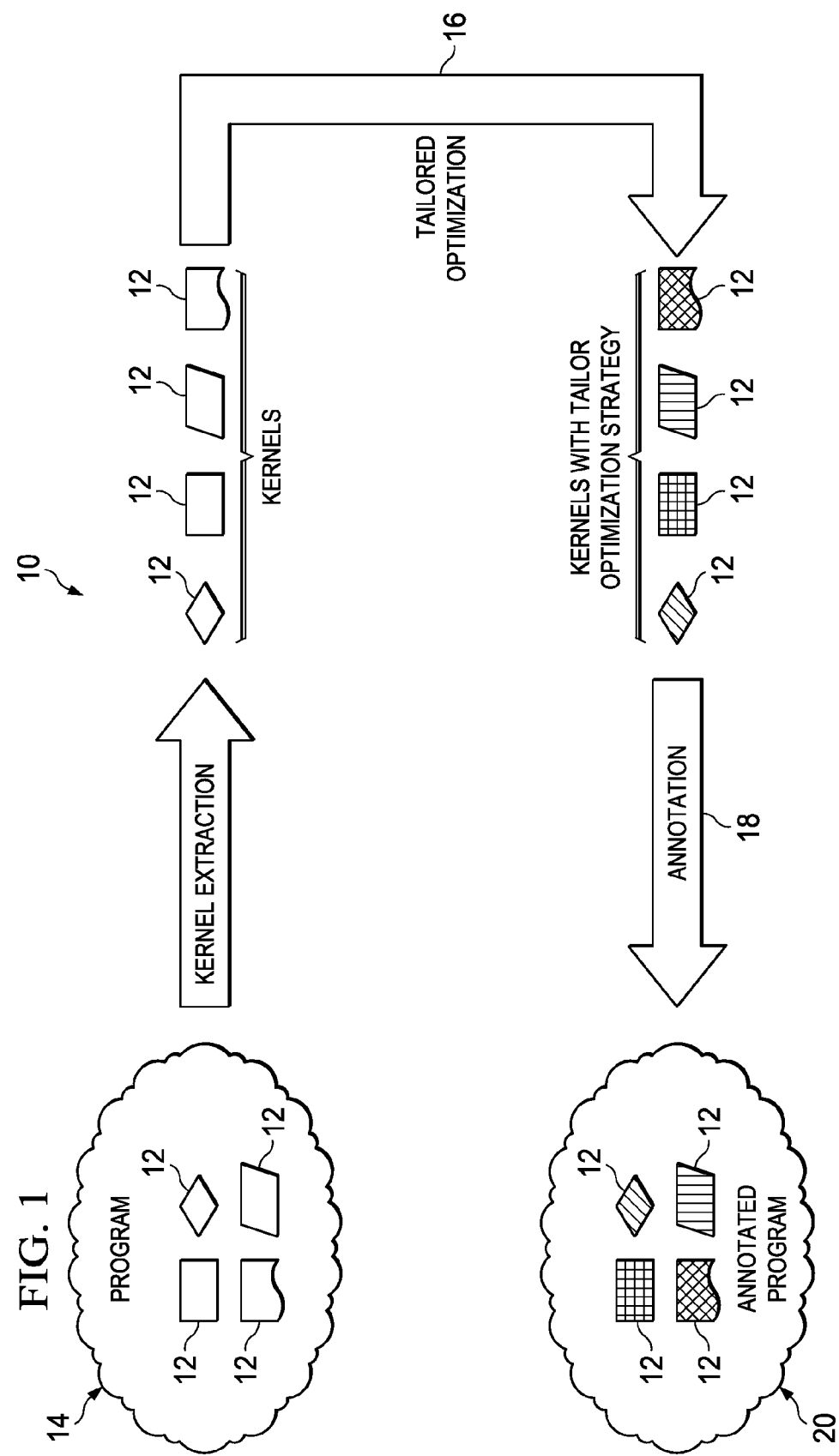
FIG. 1 illustrates an embodiment performance tuning process including tailored optimization (TAO)

The making and using of the presently preferred embodiments are discussed in detail below. It should be appreciated, however, that the present disclosure provides many applicable inventive concepts that can be embodied in a wide variety of specific contexts. The specific embodiments discussed are merely illustrative and do not limit the scope of the disclosure.

Embodiments apply to compiler optimization, performance tuning, and performance engineering. Embodiments generally enable performance engineers to use a compiler to quickly tune individual points of interest in a large application and then transfer the tuning result to the original application.

Regarding compiler soft failures, two factors generally contribute to soft failures. First, compiler writers frequently use heuristics to make analysis decisions in a strict time constraint because many compiler problems are non-deterministic polynomial time hard (NP-hard). To make matters worse, a lot of parameters used in these heuristics are often the result of guesses or estimations. This kind of approximation makes the effectiveness highly variable to compiler inputs. If these heuristics and estimations are hard-coded in the compilers, they will be out of the control of performance engineers. Although compiler options can be used to control the heuristics, most of them have a very coarse effectiveness granularity; they often impact the global behavior of the compiler, making it impossible to find a heuristic that fits all the hot spots in the same source file.

Second, many optimizations are implemented only to catch common cases to the implementer's best knowledge. Small variations of the common cases could easily baffle these optimizations. Often, a simple nuance in input (the intermediate representation (IR)) could break down an analysis or optimization, pushing the compilation in an unwelcome direction. Because it is often the case that a series of analyses and transformations are needed to accomplish the job, sensitive analyses or optimizations make compilation a very subtle process that is full of butterfly effects. That is, a seemingly insignificant change or glitch on the upstream analysis or transformation could cause dramatic differences in the compilation result. Therefore, every involved part generally should behave as expected.

The above two factors together with today's prevalent inflexible compiler working model can cause severe problems for performance engineering. In the prevalent model, an optimizing compiler is mostly used as a black-box tool controlled by a limited number of options. The most widely used options are optimization levels, which are too inflexible to give users fine-grained control over the compiler behavior. Alternatively, compiler options could be used. These options can be used to switch on or off certain optimizations, tweak heuristics parameters, and so on. However, the impact scope of these compiler options is very coarse-grained; they globally change the compiler's behaviors in a sense of file or entire project.

Another more advanced approach is using special pragmas, directives or extended keywords. Though these constructs have been widely used for some specific purposes (such as loop parallelization, program hints, data property annotation), their scopes are still too limited to control the numerous behavior of a compiler. For example, there are not pragmas for similar programming constructs that turn off a specific optimization instance during compilation. Another example is that there are existing pragmas or similar programming constructs that tell a compiler how to handle very specific data structures (such as an edge in a data dependence graph) in a specific phase during compilation. Fine-grained control over these compiler behaviors is beneficial for tuning.

If the above approaches fail, the last resort would be modifying the compiler if the compiler source is available. Modifying the compiler for performance tuning is a quite demanding task. The engineers need to know not only what every analysis/optimization does (similar to what is required in the more advanced approaches mentioned above), they must also know a lot of specific details such as the algorithms and compiler idiosyncrasies, such as data structures, implementation tricks, and the original design trade-offs (or sometimes hacks) in the compiler. Knowledge and experiences specific to an individual compiler require a lot of time to acquire and are often beyond the time and resource allowed for a performance tuning project.

It is an irony that with so much time and resources invested in underlying hardware, sophisticated software, and a powerful compiler integrated with the state-of-the-art technologies, the generated binary still has a big gap in being able to take full advantage of the hardware because the delicate compilation process is ruined by some small inflexibilities of heuristics. Furthermore, the performance engineers cannot do anything about it without becoming experienced with the compiler internals.

With the heavy use of heuristics and delicate compilation process, it is generally impossible or impractical to maximize performance with the existing black-box compiler working model. To squeeze the maximum performance out of the underlying hardware, an embodiment divide-and-conquer strategy singles the individual kernels (a.k.a., hot spots) in a large application program and fine-tunes them with different compilation strategies. These different compilation strategies are then transferred back to the original application in the form of pragmas. By tailoring individual optimization strategy for different hot spots, an embodiment generally avoids the inflexible, global configuration in existing compilers and achieves maximal performance for the different the hot spots in the application. Tailored optimization uses a highly modular, configurable design and implementation of compiler components and a powerful program annotation framework that makes the compiler very maneuverable.

An embodiment provides a simple, practical yet powerful approach/system for compiler optimization called tailored optimization (TAO). TAO facilitates the interaction between an optimizing compiler and performance engineers to improve the maneuverability and usability of the compiler. Compared with the existing black-box-style compilation approach, TAO gives performance engineers more control of the compiler's behavior and can greatly reduce the complexity of performance tuning.

An embodiment TAO approach includes several aspects: dividing and fine-tuning the hot spots, a highly modular and configurable compiler framework, and a mechanism that makes each optimization phase controllable by programmers or performance engineers. An embodiment transfers the tuning result of individual hot spot back to the host programs seamlessly, and makes each optimization phase controllable on each individual hot spot.

An embodiment provides fine-grained content-sensitive control of compiler behavior, maneuverability of compiler usage, and efficient performance engineering. An embodiment performance tuning approach allows each component of a compiler to be designed in a highly configurable, modular way, and allows the user to annotate the program with location-specific compiler options telling the compiler how to optimize the associated code during compilation. This enables the performance engineers to fine-tune each point of interest in the source code without digging into compiler internals, and then transfer the local tuning result back to the entire application seamlessly. An embodiment makes performance engineering significantly faster and simpler, resulting in shortened time-to-market, reduced cost, boosted performance and increased competitiveness.

In an embodiment, each component of a compiler is designed and implemented in a highly configurable way, exposing all the possible trade-offs or allowing the user to use brute-force to tell the compiler what action should be taken. An embodiment divides and locates the hot spots in the application, fine-tunes them and finds a specific optimization strategy for each of them, and then uses program annotation (such as pragma, directives, keywords, data bases, description files) to annotate programs. Each component accepts the annotation specific to itself and takes actions accordingly.

Embodiments tailor optimizations for any user-defined spot in code optimization, and avoid a general compilation configuration that might adversely affect some hot spots in the source code. An embodiment simplifies and accelerates performance tuning without the need to dig into the internals of a compiler or modify assembly. Embodiments apply to compiler and tool chain for processors, performance engineering tools, compilers, compiler generators, hardware-software co-design, and processor design.

An embodiment TAO system allows fine-grained control over significant optimization items or hot spots to the user. A user can tweak the heuristics parameters for an optimization so that the heuristics work towards the user's expectation. For example, a cost threshold could be tuned downward for a specific loop so that the compiler could hoist a specific loop invariant, which would not be hoisted with the default compiler heuristics. Furthermore, the user could even directly tell the compiler to ignore its heuristics or analysis result and just listen to what the user tells it. For example, a user can use pragma to tell the compiler to ignore a specific data dependence edge, which is falsely generated due to imperfect data dependence analysis. It would take a lot of the time to fix the root cause for the spurious data dependence edge in the compiler (if it is possible at all). But if the user is sure the edge is spurious and impeding important optimization, the user can simply use tailored optimization to work around it quickly.

FIG. 1 shows the performance tuning process in TAO's working model. The method 10 for tailored compiler optimization generally begins with extracting kernels 12 from an application program 14. In an embodiment, one or more of the kernels 12 extracted from the application program 14 is a control construct, a straight-line code snippet, a function, and the like in or from the application program 14. The decision regarding which of the kernels 12 to extract may depend on a variety of different factors or based upon certain performance criteria such as, for example, whether the kernel is a loop in the application program 14, whether the kernel is a part of the application program 14 known by a performance engineer or another to have quality problems (e.g., the quality at which the kernel 12 will compile using the default compilation strategy of a compiler), a length of runtime, a code size, a length of compilation time, and so on. The kernels 12 may be stored in a memory in the form of digital files smaller in size that the overall application program 14. The kernels 12 may be stored in a memory or memory device of some kind.

Still referring to FIG. 1, after the kernels 12 have been extracted, they are performance tuned using tailored optimization (TAO) 16 in order to determine a tailored optimization strategy different. The tailored optimization strategy is generally different than a default optimization strategy of a compiler. Therefore, specific kernels 12 may be compiled differently than if only the default compilation strategies of a compiler are employed. As a result of the tailored optimization strategy, performance parameters such as, for example, the quality of compilation of kernels 12, the quality of the binary output after compilation, and so on, may be improved.

In an embodiment, each of the kernels 12 in FIG. 1 is performance tuned by testing a quality of compilation for the kernel when compiled using a variety of different compilation strategies. In other words, a nested loop is employed to test a compilation quality for a kernel using a first compilation strategy, to test a compilation quality for a kernel using a second compilation strategy, to test a compilation quality for a kernel using a third compilation strategy, and so on. This repetitive process of compiling each kernel using a compiler may be repeated for each compilation strategy offered by that compiler or repeated for some subset of available strategies. In an embodiment, the performance tuning is performed entirely and automatically by a computer or other processing device once the kernels 12 have been extracted.

After the kernels 12 have each been repeatedly compiled using different compilation strategies, the tailored optimization strategy for each kernel is selected. The tailored optimization strategy may be selected based on which compilation strategy compiled the kernel the fastest, which compiled the most accurately, and so on. In an embodiment, the tailored optimization strategy may be selected based on the performance criteria noted above. In an embodiment, a user (e.g., a performance engineer) is given the opportunity to select the tailored optimization strategy from the set of compilation strategies that were tested. In an embodiment, the tailored optimization strategy is automatically selected by a predetermined performance metric such as, for example, which of the tested compilation strategies compiled the kernel 12 the fastest, the most accurately, and so on.

Once a tailored optimization strategy (a.k.a., tip for the best optimization) has been assigned to each of the kernels 12 in FIG. 1, the application program 14 is annotated 18 to identify the tailored optimization strategy determined for each of the kernels 12. In an embodiment, a computer or similar device is used to annotate 18 the application program 14. In an embodiment, the application program 14 is annotated 18 by inserting pragma directly into the application program 14. In an embodiment, the application program 14 is annotated 18 by including a reference, directive, or pointer to a configuration file, text file, database, or other external file or source in the application program 14. In an embodiment, the application program is annotated by embedding a compiler hint or hints (e.g., pragma, directives, magic comments, and so on) corresponding to each of the kernels into the application program 14. In light of the annotation of the application program, an annotated application program 20 is generated. The annotated application program 20 is configured to be loaded into a compiler.

With TAO the performance engineers closely follow the important transformations during compilation and the final binaries. TAO uses a divide-and-conquer strategy: the hot spots in the hosting application are identified and singled out to separate kernels for ease of tuning. A hot spot could be a function, a loop or a lexical block in the program. The performance tuning is the process to find the optimal strategies or tips to generate efficient or desired code. The result can include information such as tweaking of heuristics parameters, turning on or off certain compiler phases, switching among different analysis strategies in certain phases, etc. Therefore the tuning could impact a wide spectrum of compiler processes, dictating the compiler to behave as desired during compilation.

Obviously, it is highly possible that the strategies or tips for each individual hot spot are different from others. TAO allows the performance engineers to keep the best compilation strategies for each individual hot spot and feed them back to the compiler. By customizing optimization strategies for each hot spot, TAO avoids sticking to an inflexible strategy that generates sub-optimal binaries for certain hot spots with a strategy that is probably the best for the all the hot spots on average. A second order advantage is that TAO allows a performance engineer to orchestrate multiple compiler phases to achieve sophisticated transformation sequences.

After performance tuning for the kernels, for each hot spot a customized optimization tip set is determined that includes the optimization strategies that are not from the default compiler. Each individual optimization tip set is associated with the corresponding hot spot so that they can be used for the compilation of the host program. The annotation can be in different forms. For example, tips can be annotated into the host source code in form of pragma. Alternatively, tips can also be associated with their corresponding hot spots in configuration files or databases, which will be queried when the host program is compiled.

During compilation of the host program, the compiler identifies these hot spots with tailored optimizations through pragmas or configuration files. Then the compiler generates a working item by associating the annotated tips and the IR of the corresponding hot spots. For example, a loop and its optimization tips can be an individual working item for the loop optimizations, software pipelining, hardware loop generation, etc. Similarly, a lexical block and a function can also be a working item for function-based or region-based optimizations. These tips will be used to control the compiler behavior of the associated hot spot.

Because the customized tips for each hot spot might cover different components in compilation process, these strategies are precisely dispatched to their corresponding optimization phases. Therefore, the compiler components have a different design compared with traditional compilers.

Figure 2:
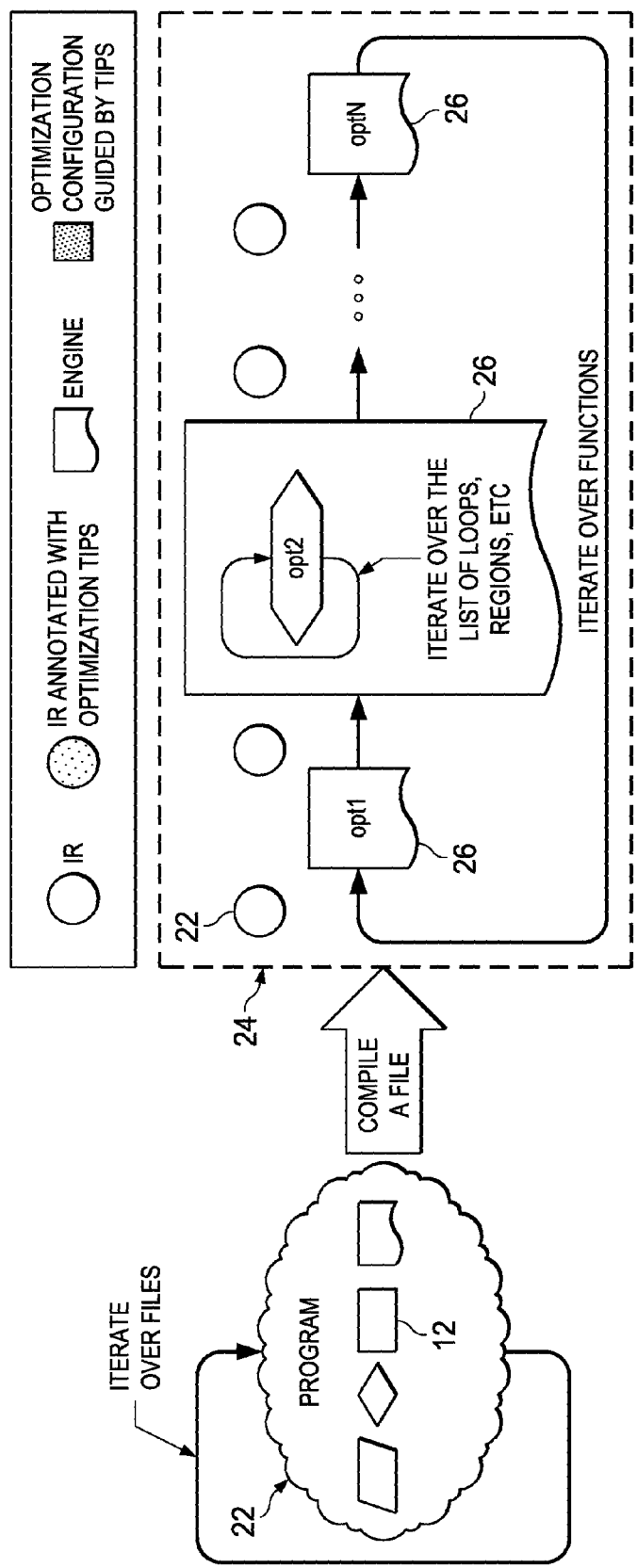
FIG. 2 illustrates operation of a compiler without the benefit of tailored optimization as shown in FIG. 1.
Figure 3:
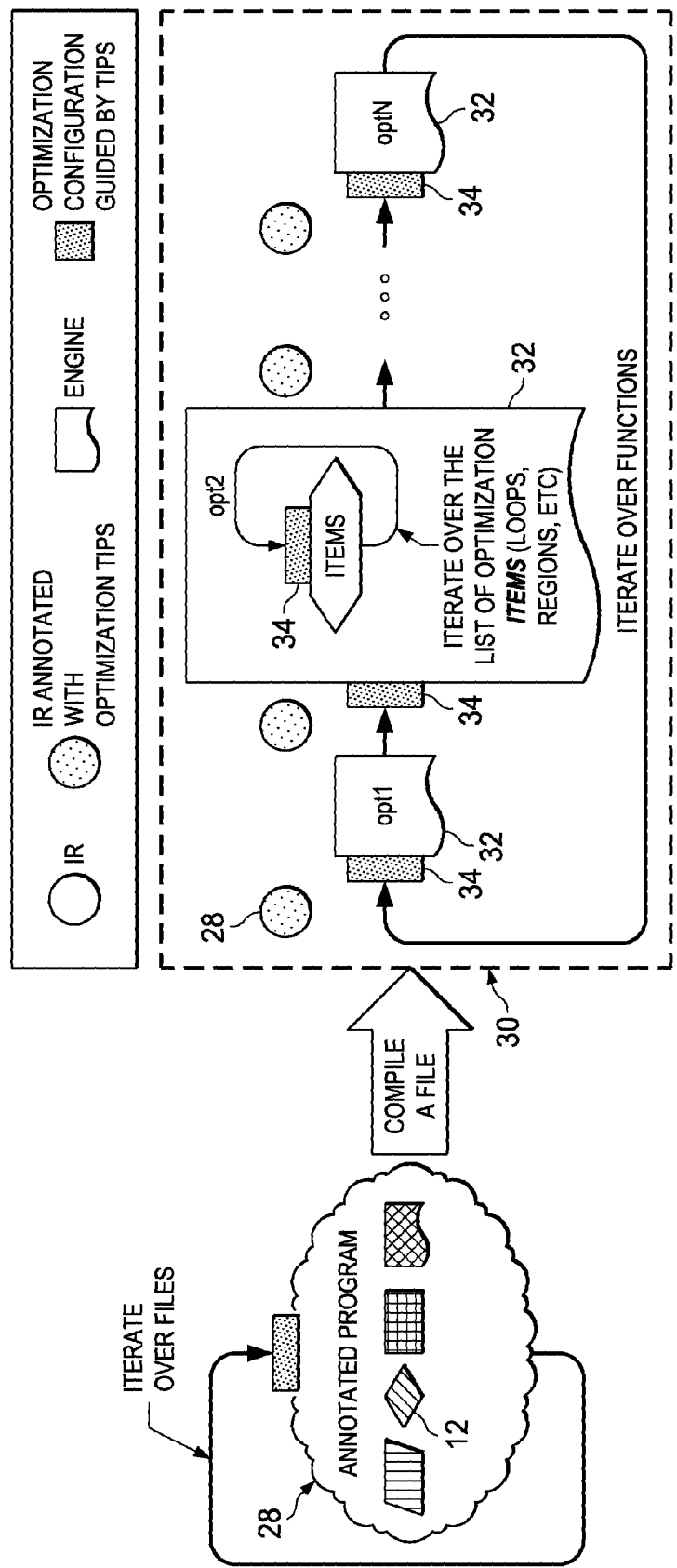
FIG. 3 illustrates an embodiment operation of a compiler with the benefit of tailored optimization as shown in FIG. 1.

FIG. 2 and FIG. 3 compare an embodiment compiler with tailored optimizations against traditional compilers. Generally, the shaded shapes in FIG. 3 are specific to a compiler with tailored optimizations. As shown in FIG. 2, an application program 22 (which has not had the benefit of tailored optimization) is loaded into a compiler 24. The application program 22 is converted to an intermediate representation (IR), which is generally code in a machine-readable format as opposed to a human readable format. Thereafter, the application program 22 is passed through a sequence of optimization engines 26 (e.g., opt1, opt2 . . . optN) for each function in the application program 22. In other words, the optimization engines 26 of the compiler 24 iterate over the functions in the application program 22. In some circumstances, one or more of the optimization engines 26, such as opt2, is complex and also iterates over a list of working items (e.g., loops, regions, etc.). Once the application program 22 has been passed through the optimization engines 26 for each function, a compiled object is output in the form of binary code.

Referring now to FIG. 3, an application program 28 which has had the benefit of tailored optimization 16 (FIG. 1) is loaded into a compiler 30. The application program 28 may be loaded from a host such as, for example, a memory of a computer, a remote server, a network, and the like. The application program 28 is converted to an intermediate representation (IR), which is generally code in a machine-readable format as opposed to a human readable format. Thereafter, the application program 28 is passed through a sequence of optimization engines 32 (e.g., opt1, opt2 . . . optN) for each function in the application program 28. In other words, the optimization engines 32 of the compiler 30 iterate over the functions in the application program 28. Notably, each of the optimization engines 32 in FIG. 3 is equipped with an adapter 34 configured to read or decipher the tailored optimization strategies for each kernel in the annotated application program 28 that was loaded into the compiler 30. In other words, the adapters 34 are able to read and understand the information (e.g., pragma, pointers, directives, reference information, etc.) that was added to the original application program. Therefore, the adapter 34 is able to instruct its corresponding optimization engine 32 to compile a particular kernel 12 or kernels using the tailored optimization strategy as opposed to the default compilation strategy of the conventional compiler 24 of FIG. 2.

In an embodiment, one or more of the optimization engines 32, such as opt2, is complex and also iterates over a list of working items (e.g., loops, regions, etc.). In an embodiment, at least one of the optimization engines, such as opt2, is equipped with a second adapter 34 as shown in FIG. 3. The second adapter 34 is configured to sequentially implement the tailored optimization strategy for each working item. Once the annotated application program 28 has been passed through the optimization engines 32 for each function, a compiled object is output in the form of binary code. Because the optimization engines 32 were instructed to use the tailored optimization strategy specific to each of the kernels 12 in the annotated program 28, the compiled result may be achieved more quickly and with better quality relative to when the tailored optimization 16 (FIG. 1) is not used.

The inputs for a TAO compilation are the TAO-annotated source files. A TAO compiler works on the annotated source files one by one. For purposes of explanation, inter-procedural optimizations (or IPO) are not described, but the TAO approach easily can be extended to IPO. Many IPOs such as inlining, cloning, alias set disambiguation can greatly benefit from TAO tips. TAO tips are used to generate annotated IRs inside the compiler.

With the support for tailored optimizations, every compiler component analyzes the TAO tips annotated in IR and performs tip-directed configuration before starting its original core functionality. This can be implemented as classes in object-oriented programming or wrapper in C. This makes sure that each optimization can be configured specific to an individual hot spot. If a hot spot doesn't have any tip associated with it, the compiler uses its own default strategy.

In a TAO embodiment, the scope of tips could be at any optimization-distinguishable item, such as source file, function, loop, region, basic block or even graph. The user can control the compiler behavior over these optimization items as long as the compiler trace is informative enough to let the user know how to identify the tip (for example loop id, data dependence edge id, heuristics parameter name, etc.) internally, and the tip-guided configuration can parse user input and update the internal state successfully.

Alternatively, the original TAO-annotated source file can be split into multiple source files, each of which contains the hot spots that have the same set of tip annotations. Then each of these split source files together with its tip annotations can be fed to the compiler. This approach is useful for function-level hot spots customization. In this embodiment, the per-hot-spot compiler re-configuration described above is not needed. However, this approach does not address cases where multiple hot spots with different optimization customization reside inside the same function.

Figure 4:
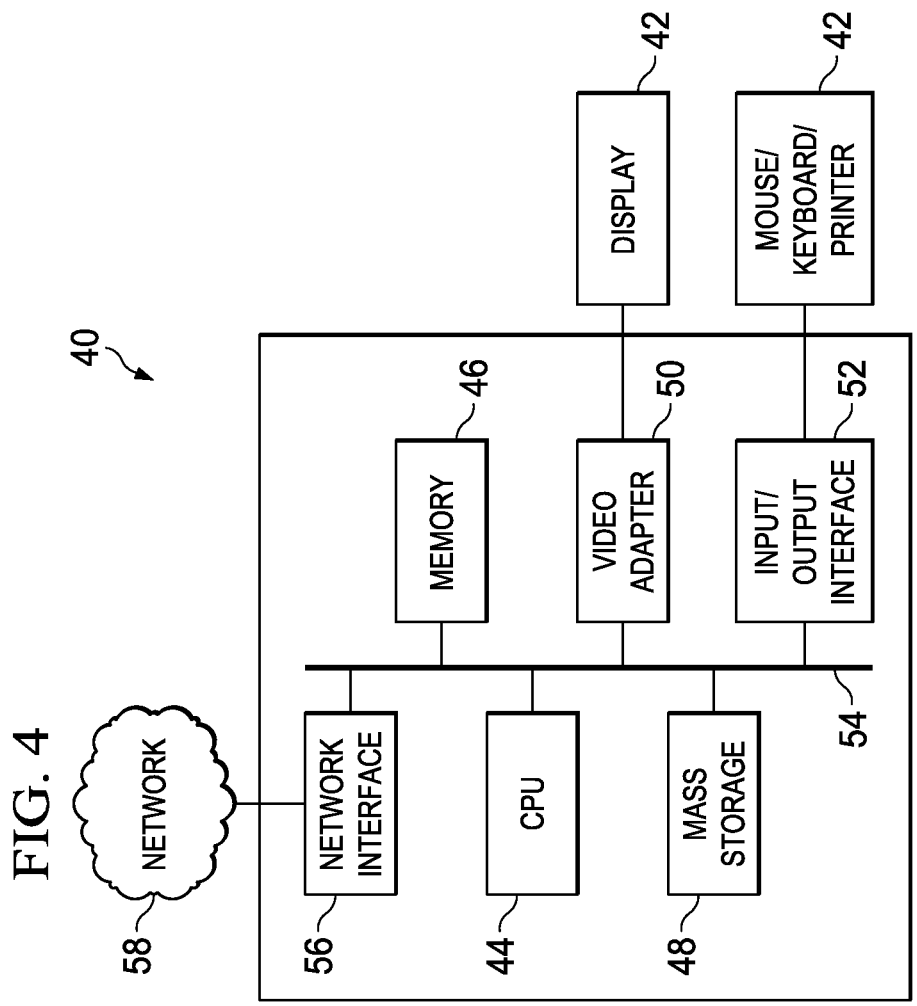
FIG. 4 is a block diagram illustrating a computing platform that may be used for implementing, for example, the devices and methods described herein in accordance with an embodiment.

FIG. 4 is a block diagram of a processing system 40 that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may comprise a processing unit equipped with one or more input/output devices 42, such as a speaker, microphone, mouse, touchscreen, keypad, keyboard, printer, display, and the like. The processing unit may include a central processing unit (CPU) 44, memory 46, a mass storage device 48, a video adapter 50, and an I/O interface 52 connected to a bus 54.

The bus 54 may be one or more of any type of several bus architectures including a memory bus or memory controller, a peripheral bus, video bus, or the like. The CPU 44 may comprise any type of electronic data processor. The memory 46 may comprise any type of system memory such as static random access memory (SRAM), dynamic random access memory (DRAM), synchronous DRAM (SDRAM), read-only memory (ROM), a combination thereof, or the like. In an embodiment, the memory 46 may include ROM for use at boot-up, and DRAM for program and data storage for use while executing programs.

The non-transient mass storage device 48 may comprise any type of storage device configured to store data, programs, and other information and to make the data, programs, and other information accessible via the bus 54. The mass storage device 48 may comprise, for example, one or more of a solid state drive, hard disk drive, a magnetic disk drive, an optical disk drive, or the like.

The video adapter 50 and the I/O interface 52 provide interfaces to couple external input and output devices 42 to the processing unit 40. As illustrated, examples of input and output devices include the display coupled to the video adapter and the mouse/keyboard/printer coupled to the I/O interface. Other devices may be coupled to the processing unit 40, and additional or fewer interface cards may be utilized. For example, a serial interface card (not shown) may be used to provide a serial interface for a printer.

The processing unit 40 also includes one or more network interfaces 56, which may comprise wired links, such as an Ethernet cable or the like, and/or wireless links to access nodes or different networks. The network interface 56 allows the processing unit to communicate with remote units via the networks 58. For example, the network interface 56 may provide wireless communication via one or more transmitters/transmit antennas and one or more receivers/receive antennas. In an embodiment, the processing unit 40 is coupled to a local-area network or a wide-area network for data processing and communications with remote devices, such as other processing units, the Internet, remote storage facilities, or the like.

While the disclosure provides illustrative embodiments, this description is not intended to be construed in a limiting sense. Various modifications and combinations of the illustrative embodiments, as well as other embodiments, will be apparent to persons skilled in the art upon reference to the description. It is therefore intended that the appended claims encompass any such modifications or embodiments.

What is claimed is:

1. A method for tailored compiler optimization, comprising:
analyzing first performance criteria for each of a plurality of kernels in an application program;
identifying selected kernels of the plurality of kernels to extract from the application program in accordance with the analyzed first performance criteria;
extracting the selected kernels from the application program;
performance tuning the selected kernels to determine a tailored optimization strategy for each of the selected kernels, the tailored optimization strategy different than a default optimization strategy of a compiler for each of the selected kernels; and
annotating, using a computer, the application program after the selected kernels have been extracted and performance tuned to identify the tailored optimization strategy determined for each of the selected kernels;
wherein the tailored optimization strategy for each of the selected kernels is in accordance with second performance criteria.

2. The method of claim 1, further comprising saving the selected kernels to a memory after the selected kernels are extracted from the application program.

3. The method of claim 1, wherein at least one of the selected kernels extracted from the application program is at least one of a control construct, a straight-line code snippet, and a function in the application program.

4. The method of claim 1, wherein the application program is annotated by embedding a compiler hint corresponding to each of the selected kernels into the application program.

5. The method of claim 1, wherein the application program is annotated by embedding into the application program a pointer to one of a database and a configuration file corresponding to each of the selected kernels.

6. The method of claim 1, wherein the performance tuning the selected kernels to determine the tailored optimization strategy comprises selection of the tailored optimization strategy by a user.

7. The method of claim 1, further comprising performance tuning the selected kernels to determine the tailored optimization strategy for each of the selected kernels by testing a quality of compilation for each of the selected kernels using the compiler and a variety of different compilation strategies.

8. The method of claim 1, further comprising performance tuning the selected kernels to determine the tailored optimization strategy for each of the selected kernels using a nested loop to repeatedly test a quality of compilation for each of the selected kernels using the compiler and a variety of different compilation strategies.

9. The method of claim 1, wherein the performance tuning is performed using the computer.

10. The method of claim 1, further comprising loading the application program as annotated into the compiler.

11. A method for tailored compiler optimization, comprising:
receiving an annotated program from a host after a plurality of kernels in an application program have been analyzed for first performance criteria, after selected kernels of the plurality of kernels have been identified to extract from the application program in accordance with the analyzed first performance criteria, and after the selected kernels have been extracted from the application program and performance tuned, the annotated program identifying a tailored optimization strategy for each of the selected kernels;
passing the annotated program through a sequence of optimization engines, each of the optimization engines equipped with an adapter configured to implement the tailored optimization strategy corresponding to at least one of the selected kernels; and
outputting a compiled object program after passing the annotated program through the sequence of optimization engines;
wherein the tailored optimization strategy for each of the selected kernels is in accordance with second performance criteria.

12. The method of claim 11, wherein the tailored optimization strategy is different than a default optimization strategy for each of the selected kernels.

13. The method of claim 11, further comprising passing the annotated program through a sequence of optimization engines for each function in the annotated program.

14. The method of claim 11, wherein at least one of the optimization engines is equipped with a second adapter, the second adapter configured to sequentially implement the tailored optimization strategy for each working item.

15. The method of claim 11, wherein the compiled object program is output as binary code.

16. The method of claim 11, further comprising converting the annotated program to an intermediate representation, the intermediate representation in a machine-readable form.

17. A processing system configured to implement tailored compiler optimization, comprising:
 a processor; and
 a memory operably coupled to the processor, the memory storing a tailored optimization module and a compiler module, the tailored optimization module configured to analyze first performance criteria for each of a plurality of kernels in an application program, to identify selected kernels of the plurality of kernels to extract from the application program in accordance with the analyzed first performance criteria, extract the selected kernels from the application program loaded into the memory, to performance tune the selected kernels by testing a quality of compilation for each of the selected kernels using the compiler module and a variety of different compilation strategies to determine a tailored optimization strategy for each of the selected kernels, and to annotate the application program after the selected kernels have been extracted and performance tuned to identify the tailored optimization strategy determined for each of the selected kernels; wherein the tailored optimization strategy for each of the selected kernels is in accordance with second performance criteria.

18. The processing system of claim 17, further comprising an input device operably coupled to the processor, the input device permitting a user to select the tailored optimization strategy determined for at least one of the selected kernels.

19. The processing system of claim 18, wherein the input device permits the user to select one of the variety of different compilation strategies and to initiate the testing the quality of compilation for the one of the variety of different compilation strategies selected.

\* \* \* \* \*